US008271868B2

(12) United States Patent
Sinyagin et al.

(10) Patent No.: US 8,271,868 B2
(45) Date of Patent: Sep. 18, 2012

(54) INSERTING WEB CONTENT INTO A DESTINATION WEBSITE

(75) Inventors: Aleksey Y. Sinyagin, Bothell, WA (US); Kevin James Riedy, Seattle, WA (US); Eric Jon Juvet, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 12/410,779

(22) Filed: Mar. 25, 2009

(65) Prior Publication Data

US 2010/0251095 A1    Sep. 30, 2010

(51) Int. Cl.
*G06F 17/24*    (2006.01)

(52) U.S. Cl. ............... 715/234; 715/242; 715/760

(58) Field of Classification Search ............... 715/234, 715/255, 769, 711, 760
See application file for complete search history.

(56) References Cited

U.S. PATENT DOCUMENTS

| | | | | |
|---|---|---|---|---|
| 6,278,448 | B1* | 8/2001 | Brown et al. | 715/866 |
| 7,219,302 | B1* | 5/2007 | O'Shaughnessy et al. | 715/752 |
| 7,328,435 | B2* | 2/2008 | Trifon | 717/171 |
| 7,599,915 | B2* | 10/2009 | Hill et al. | 1/1 |
| 7,730,082 | B2* | 6/2010 | Sah et al. | 707/770 |
| 2005/0262232 | A1 | 11/2005 | Cuervo | |
| 2007/0299857 | A1 | 12/2007 | Gwozdz | |
| 2008/0215456 | A1* | 9/2008 | West et al. | 705/27 |
| 2008/0263566 | A1 | 10/2008 | Buerge | |
| 2009/0300496 | A1* | 12/2009 | Fan et al. | 715/711 |
| 2010/0162154 | A1* | 6/2010 | Singh et al. | 715/769 |

OTHER PUBLICATIONS

Microsoft Computer Dictionary, Fifth Edition, by Microsoft Press, Published by Microsoft Press, May 1, 2002, p. 708.*
Jackson et al., "Subspace: Secure Cross-Domain Communication for Web Mashups," WWW 2007, May 8-12, 2007, Banff, Alberta, Canada, 10 pp., http://www.collinjackson.com/research/papers/fp801-jackson.pdf.
"Powerful New Developer Features," Windows Internet Explorer 8 readiness Toolkit, Jan. 5, 2009, 13 pp., http://www.microsoft.com/windows/internet-explorer/beta/readiness/developers-new.aspx.
De Keukelaere et al., "SMash: Secure Component Model for Cross-Domain Mashups on Unmodified Browsers," WWW 2008, Apr. 21-25, 2008, Beijing, China, pp. 535-544, http://www2008.org/papers/pdf/p535-dekeukelaereA.pdf.
"Cross-Domain Communication with IFrames," Jan. 5, 2009, 9 pp., http://softwareas.com/cross-domain-communication-with-iframes.
"SiteBeater Image Gallery," Jan. 5, 2009, 2 pp., http://www.sharewareconnection.com/sitebeater-image-gallery.htm.
Thorpe, "Secure Cross-Domain Communication in the Browser," Jan. 5, 2009, The Architecture Journal, 6 pp., http://msdn.microsoft.com/en-us/library/bb735305.aspx.
Crites et al., "OMash: Enabling Secure Web Mashups via Object Abstractions," CCS '08, Oct. 27-31, 2008, Alexandria, VA, 9 pp., http://www.cs.ucdavis.edu/~hchen/paper/ccs08.pdf.

* cited by examiner

*Primary Examiner* — Laurie Ries
*Assistant Examiner* — Brian A Garmon
(74) *Attorney, Agent, or Firm* — Shook, Hardy & Bacon L.L.P.

(57) ABSTRACT

An embodiment of the current invention is directed to inserting content from a source website into a destination website. Content from the source website is selected as selected content. A destination website is navigated to and, thereafter, a script is executed in a window displaying the destination website. In embodiments, the script performs a process that includes retrieving the selected content and displaying the selected content on the destination website.

10 Claims, 6 Drawing Sheets

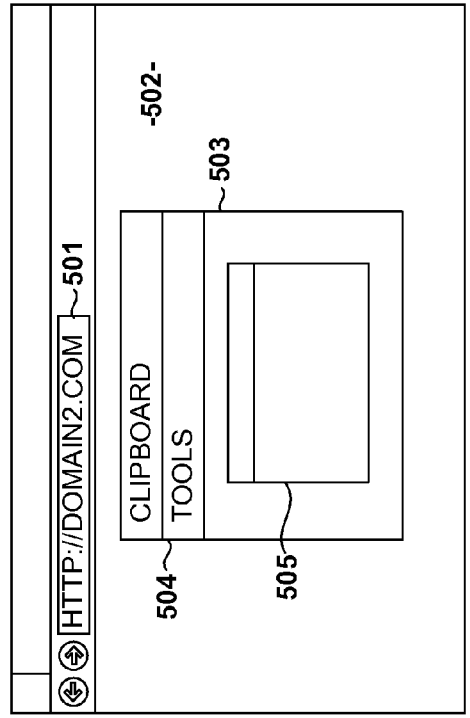
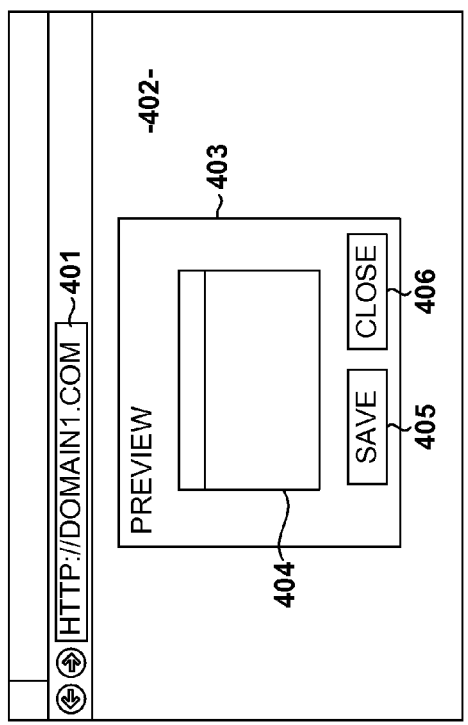

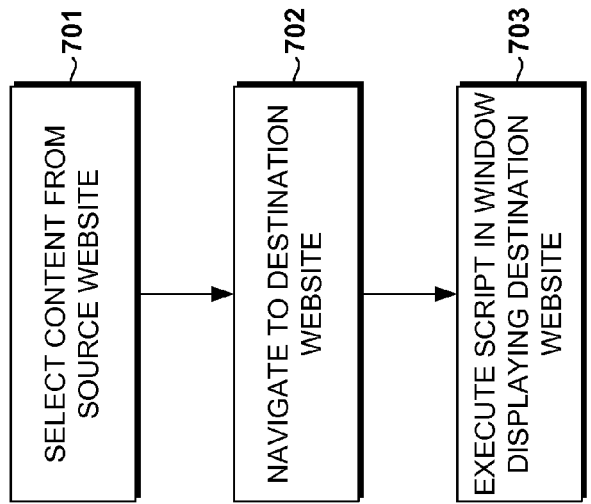
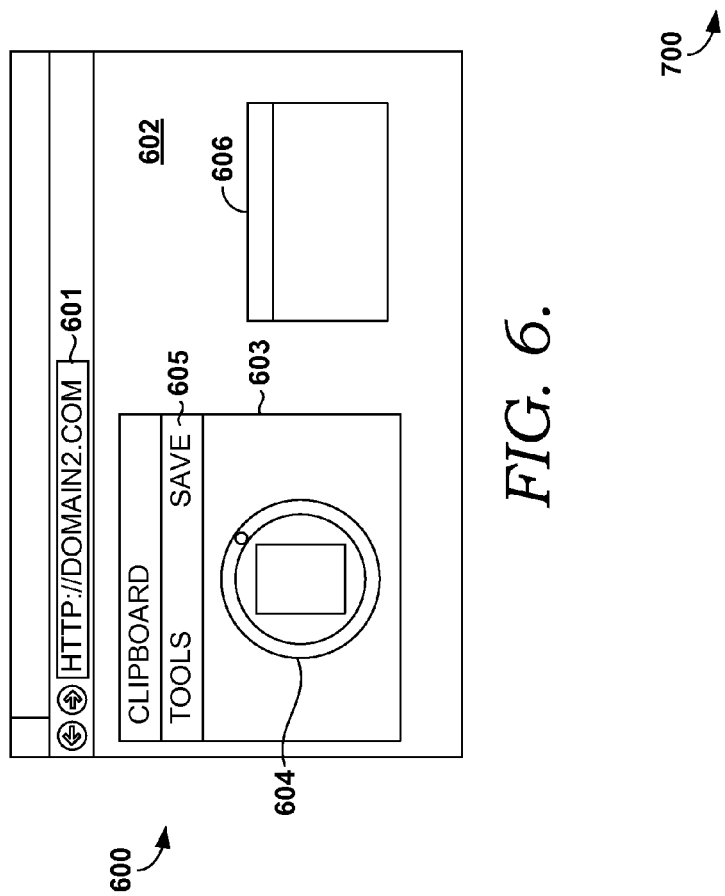

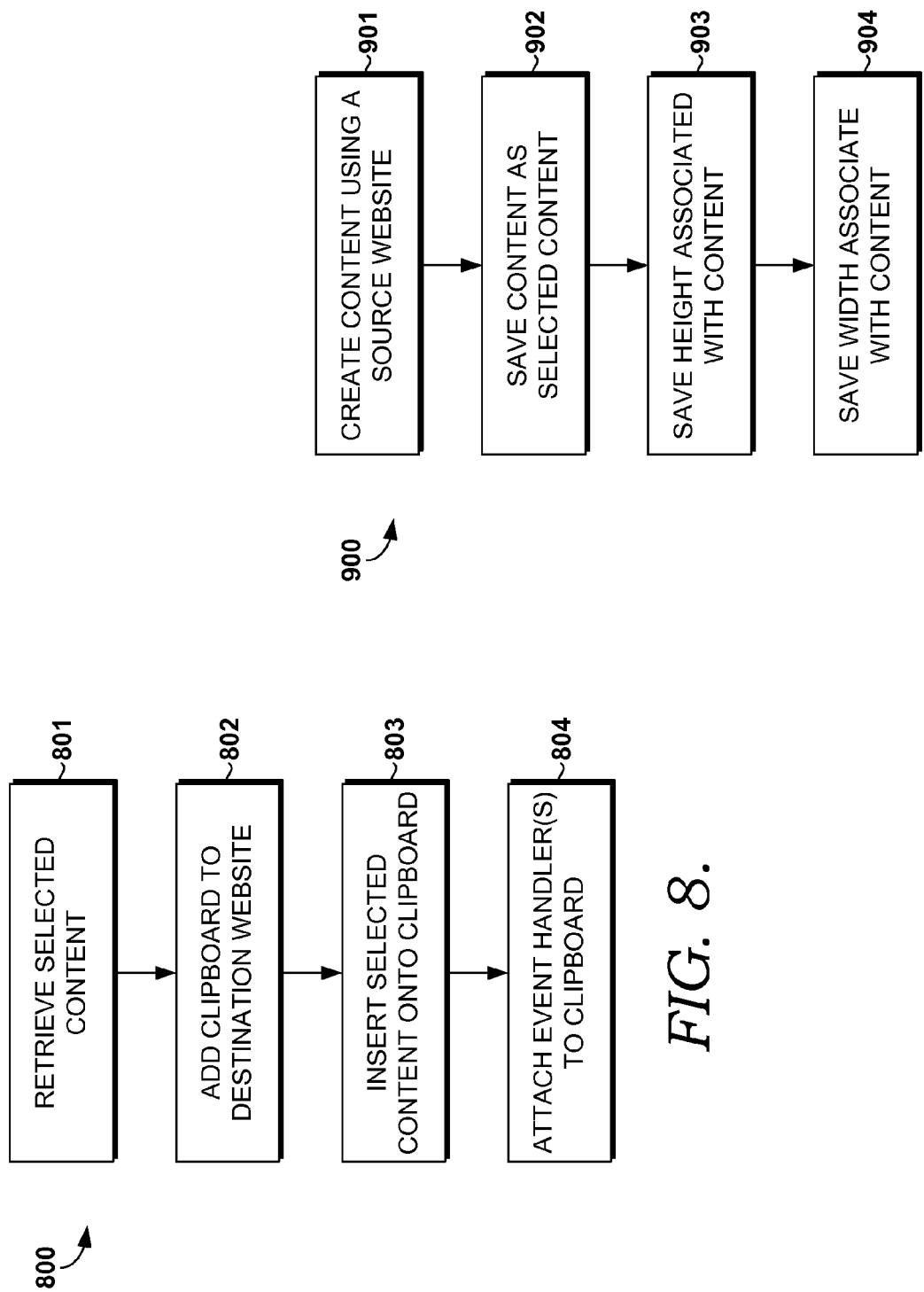

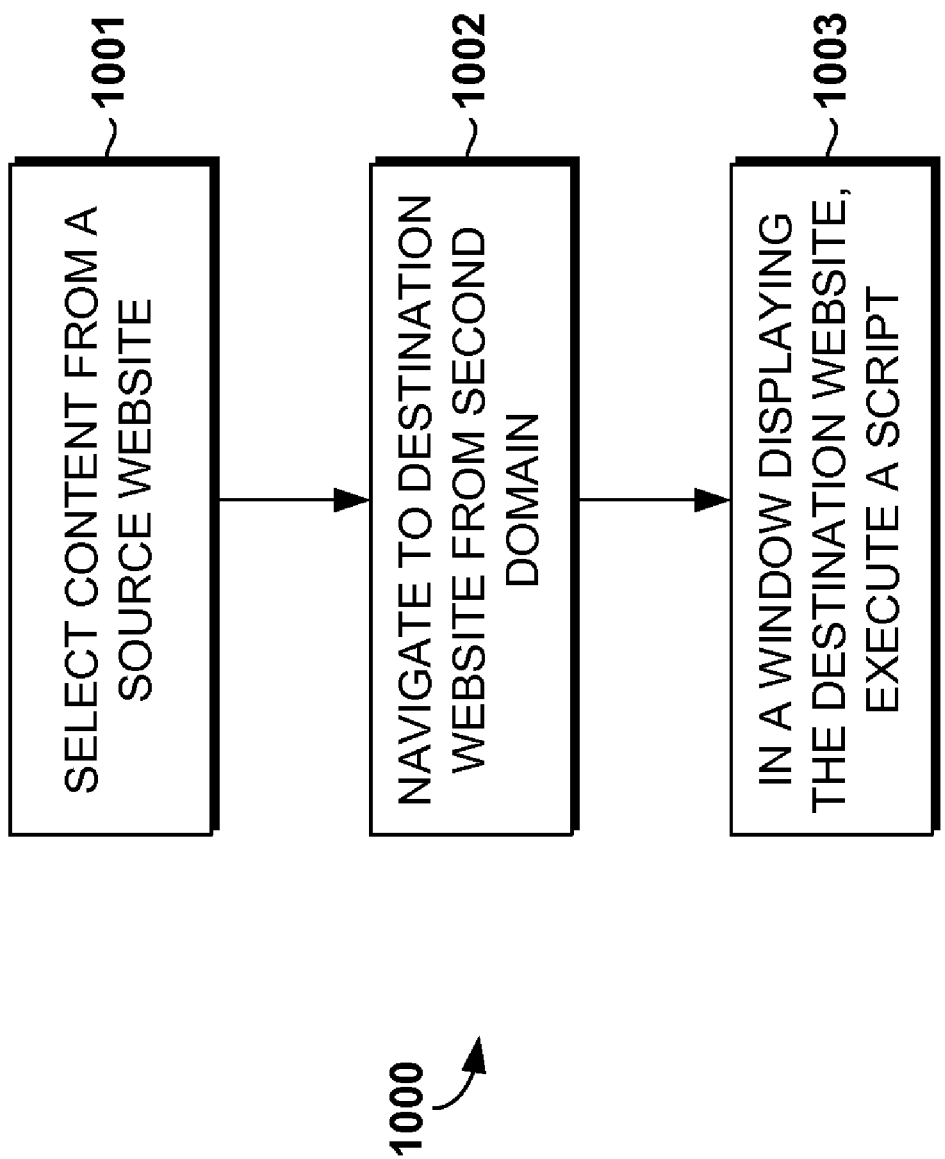

INSERTING WEB CONTENT INTO A DESTINATION WEBSITE

BACKGROUND

The Internet enables information to be distributed across a wide area through the use of webpages. One or more webpages making up a website can be hosted on computing devices attached to the Internet via various network connections. One or more computing devices can make up a domain. For example, one or more computing devices can be grouped together to form a domain with a single domain name, such as mydomain.com. A website residing on those computing devices is considered part of the domain.

Content from a website on a first domain cannot access content from a second domain. Effectively, there is a cross-domain barrier that prevents the creation of web pages or other content on one domain from integration with another web page from another domain. For example, a user creating an advertisement in one domain could not preview the advertisement as it would look on a webpage from a second domain by overlaying the advertisement on the webpage from the second domain.

SUMMARY

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

Embodiments enable content from one website to be integrated with another website despite instances where the websites are associated with separate domains. Upon selecting content to be integrated into another website, a user might navigate to a destination website to which the content is to be integrated. To integrate the selected content into the destination website, a script can be executed within the destination website that retrieves the selected content and displays the selected content on the destination website. Accordingly, a user can view the destination website having the selected content provided by or created within another website.

BRIEF DESCRIPTION OF THE DRAWINGS

Illustrative embodiments of the present invention are described in detail below with reference to the attached drawing figures, which are incorporated by reference herein and wherein:

FIG. 4 depicts an exemplary preview window, in accordance with an embodiment of the invention;

FIG. 5 depicts an exemplary clipboard, in accordance with an embodiment of the invention;

FIG. 6 depicts an exemplary destination website having content from a source website integrated therewith, in accordance with an embodiment of the invention;

FIG. 7 is a flow diagram depicting a method of inserting content from a source website into a destination website, in accordance with an embodiment of the invention;

FIG. 8 is a flow diagram depicting a method of inserting selected content into a website, in accordance with an embodiment of the invention;

FIG. 9 is a flow diagram depicting a method of saving content as selected content, in accordance with an embodiment of the invention; and FIG. 10 is a flow diagram depicting a method of displaying selected content from a source website in a destination website, in accordance with an embodiment of the invention.

DETAILED DESCRIPTION

Figure 1:
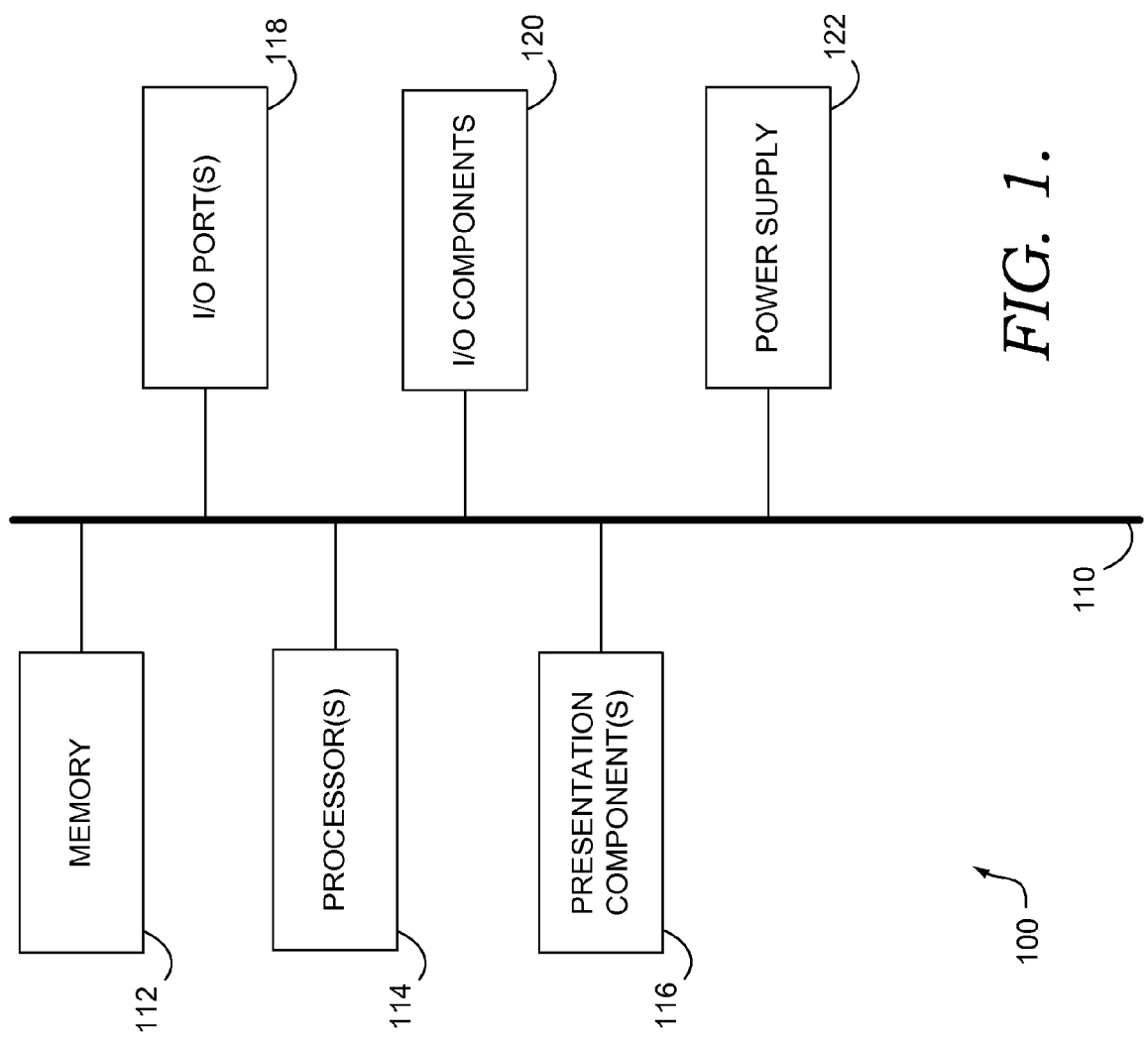
FIG. 1 depicts a block diagram of an exemplary computing environment suitable for implementing an embodiment of the invention.

The subject matter of embodiments of the present invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention are directed to, among other things, inserting content from a source website into a destination website. Websites can be made up of collections of webpages stored on a server(s) that is part of a domain. Such webpages can include a variety of components. For example, webpages can include HyperText Markup Language (HTML), scripts that are executable as part of the webpage (e.g., a JAVASCRIPT), and Cascading Style Sheets (CSS). A source website refers to a website having or being used to generate content to be inserted into another website (i.e., a destination website). That is, a source website provides content (e.g., preexisting content or user-generated content) to be integrated into a destination website. A destination website refers to a website that receives or obtains content provided by a source website. Accordingly, a destination website integrates content provided by a source website into the destination website. Content might be, by way of example and not limitation, text content, image content, video content, animated content, audio content, or a combination thereof. In one embodiment, content might be an advertisement, such as an advertisement in the form of HyperText Markup Language (HTML). Content from a source website might be displayed on a destination website through the use of an IFRAME. An IFRAME can provide an additional web browser window embedded within the destination website. The content from the destination website cannot be accessed from the source website when using an IFRAME. Additionally, the content from the source website cannot be access from the destination website when using an IFRAME.

Websites can be associated with particular domains. Domains can be identified by domain names, for example, mydomain1.com. In one embodiment, a source website is associated with one domain while a destination website is associated with another domain (i.e., a domain separate and distinct from the domain in association with the source website). Webpages from a first domain may not have access to webpages from a second domain. A cross-domain barrier can prevent content from a first domain from accessing and editing content from a second domain. By way of example, a webpage residing on a first domain may not insert itself, or a portion thereof, over a webpage residing on a second domain.

Accordingly, embodiments of the present invention enable a source webpage in association with a first domain to insert at least a portion thereof over a destination webpage in association with a second domain. For instance, an advertisement created and stored using a source webpage in association with a domain can be previewed on a destination website in association with another domain. Alternatively, in another embodiment, a source website and a destination website might be associated with a same domain.

A favorite can be a Universal Resource Identifier (URI) that identifies an address to a webpage. Favorites can be stored by a web browser to allow quick access to webpages. Scripts can be similarly stored for quick access. Favelets are scripts (e.g., JAVASCRIPT) stored by a web browser. When selected, a favelet can be run in a webpage, such as a webpage being currently displayed via the web browser. A favelet can have access to data and elements of that currently displayed website or webpage. Such favelets can be utilized to enable inserting content from a source website into a destination website.

An embodiment of the invention is directed to inserting content from a source website into a destination website. Content from the source website is selected as selected content. A destination website is navigated to. A script is executed in a window displaying the destination website. The script performs a process that includes retrieving the selected content and displaying the selected content on the destination website.

Another embodiment of the invention is directed to previewing content designed via a source website from a first domain on a destination website from a second domain. Content from a first domain is selected as selected content. The destination website from the second domain is navigated to. A script is executed in a window displaying the destination website from the second domain. The script performs a method that includes retrieving the selected content on the first domain, adding a clipboard to the destination website, inserting the selected content on the first domain to the clipboard, and attaching event handlers to the clipboard configured to allow the selected content to be dragged and dropped onto the destination website.

A further embodiment of the invention is directed to inserting content from a first domain into a destination website. A webpage is created that resides in a first domain. A save button is selected that saves the webpage as selected content, saves a height associated with the webpage; and saves a width associated with the webpage. The destination website from a second domain is navigated to. A favelet is executed in a window displaying the destination website. The favelet performs a process that includes retrieving the selected content of the first domain; adding a clipboard to the destination website; inserting the selected content on the first domain to the clipboard; and attaching event handlers to the clipboard configured to allow the selected content to be dragged and dropped onto the website.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, many processors have memory. We recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and include both volatile and nonvolatile media, removable and nonremovable media. By way of example, and not limitation, computer-readable media may include computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, Random-Access Memory (RAM); Read-Only Memory (ROM); Electrically-Erasable, Programmable, Read-Only Memory (EEPROM); flash memory or other memory technology; Compact Disk, Read-Only Memory (CD-ROM); digital versatile disks (DVD) or other optical disk storage; magnetic cassettes; magnetic tape; magnetic disk storage or other magnetic storage devices; or any other medium which can be used to store the desired information and which can be accessed by computing device 100.

Memory 112 includes computer-storage media in the form of volatile memory. Exemplary hardware devices include solid-state memory, such as RAM. Memory 112 includes computer-storage media in the form of nonvolatile memory. The memory 112 may be removable, nonremovable, or a combination thereof Exemplary hardware devices include solid-state memory, hard drives, optical-disc drives, etc. Computing device 100 includes one or more processors 114 that read data from various entities such as memory 112 or I/O components 120. I/O components 120 present data indications to a user or other device. Exemplary output components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
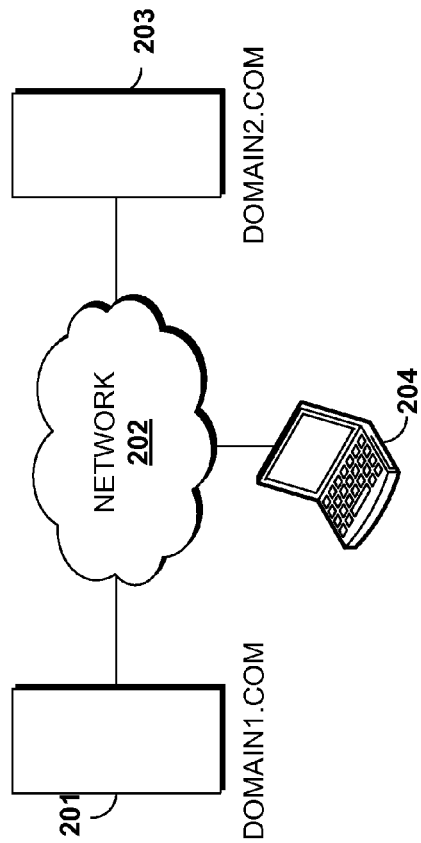
FIG. 2 depicts a block diagram of an exemplary network environment suitable for implementing an embodiment of the invention.

Turning now to FIG. 2, a diagram depicting a network environment suitable for implementing the present invention is illustrated. A client computing device 204 is connected to a network 202. By way of example, the network 202 could be the Internet. As another example, the network 202 could be a private intranet associated with a particular company. Servers 201 and 203 are connected to the network 202. Server 201 might host a website(s) or a webpage(s) related to a first domain (e.g., DOMAIN1.COM). Server 203 might host a website(s) or a webpage(s) related to a second domain (e.g., DOMAIN2.COM). By way of example only, server 201 might host a source website in association with a first domain, and server 203 might host a destination website in association with a second domain. Such servers might store data within a data store integrated therewith or remote from the server. The client computing device 204, being connected to the network 202 to which servers 201 and 203 are connected, can access websites residing on the domains controlled by the servers 201 and 202. As such, the client computing device 204 might access a source website in association with a domain controlled by server 201 to select content (e.g., preexisting website content or generated content) to present within a destination website. The client computing device 204 might access a destination website in association with a domain controlled by server 203 to obtain content within the destination website, such as content provided by the source website.

Figure 3:
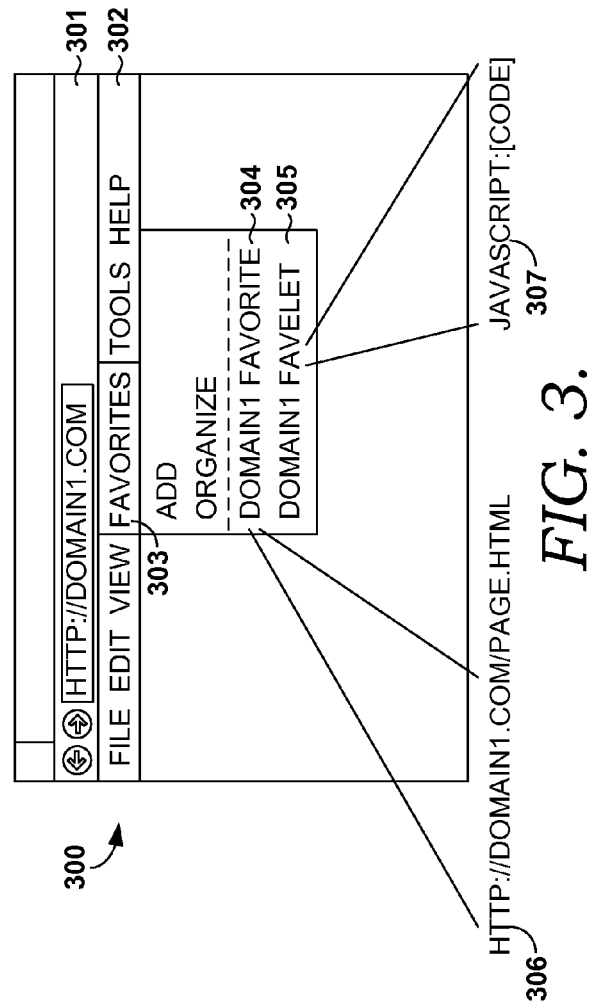
FIG. 3 depicts an exemplary web browser, in accordance with an embodiment of the invention.

Turning now to FIG. 3, a diagram of an exemplary web browser 300 is illustrated. The web browser contains an address bar 301, allowing the entry of website addresses for the purpose of directing the web browser 300 to navigate to particular websites. A menu bar 302 enables various functions provided by the web browser 300 to be accessed. One set of functions relates to favorites that can be accessed from a favorites drop-down menu 303. The favorites drop-down menu can have a number of functions including an ability to add and organize various favorites. Additionally, a list of favorites (e.g., contain favorites 304 and 305) might be saved by the web browser 300.

According to an embodiment of the invention, a favorite might be a standard favorite or a favelet. A standard favorite and/or a favelet can be saved in the favorites drop-down menu 303. A standard favorite, such as favorite 304, represents a Universal Resource Locator (URL) 306 that points to particular website or webpage within a particular website. Upon receiving an indication that a particular standard favorite has been selected, the web browser 300 navigates or links to the website, displaying the website in a browser window.

A favelet (or a bookmarklet) can be stored in the favorites drop-down menu 303 of the web browser 300. A favelet 305 represents a script 307 that can be executed by the web browser 300. Upon receiving an indication that a particular favelet has been selected, the web browser 300 can execute the script 307 within the context of a webpage, such as the currently loaded webpage (e.g., without reloading the webpage or loading a new webpage). A favelet can have access to any data that is part of the currently loaded webpage without regard to the domain that is associated with that currently loaded webpage. In embodiments, a favelet can be used to insert content from a source website into a destination website.

Turning now to FIG. 4, a diagram of a webpage 400 used to select content from a source website for insertion into a destination website is illustrated. A webpage 400 on a first domain (e.g., DOMAIN1.COM 401), such as a source webpage, can enable a selection of content. Content, such as content preexisting within a source website or generated via the source website (e.g., user-generated content) can be saved as selected content and later accessed by a favelet. Such content might be saved in connection with a server hosting the source website. In one embodiment, a preview window 403 might be used to preview web content 404. By way of example only, a web page could be created using the webpage 400 and previewed in the preview window 403. As another example, an advertisement for use on a destination webpage could be created using the webpage 400 and previewed in the preview window 403.

The preview window 403 could contain a number of buttons allowing various modifications of the previewed content 404. A close button 406 could be presented in the preview window 403 to allow the preview window 403 to be closed. A save button 405 might be presented in the preview window 403. According to an embodiment of the invention, the save button 405 is operable to select the previewed content 404 as selected content. Such selected content can be accessible to a favelet used in connection with a destination website. The selected content, or a link thereto (e.g., a URL), may be saved to a particular location, such as a location within a data store associated with a server in relation to the source website. By way of example only, the save button 405 might initiate a save of the previewed content 404 to a location on the first domain that is accessible to a favelet stored in the favorites drop-down menu of a web browser. In embodiments, a height and/or width associated with the selected content might be saved in association with the content. There are many other features and properties of the selected content that could be saved.

A favelet could be created to access the stored previewed content, or link in association therewith, after navigation to a destination website has been performed. A favelet might be added as a favorite within a web browser such that, upon selection thereof, the favelet links to a client side JAVASCRIPT. By way of example, a favelet might be saved as a bookmark and operable to access content or a link thereto. In some embodiments, a favelet might be saved as a bookmark from a source website in association with a domain. Such a favelet may be operable to access content or a link thereto saved in connection with the source website of the domain. The favelet may also access various features and properties related to the saved content from the first domain. According to an embodiment, a destination website could be navigated to and a favelet selected operable to access the stored previewed content and display it within the content of the destination website. By way of example, a clipboard element could be created in which to display the saved previewed content. As can be appreciated, a favelet might be created via any website or application and at any time. For instance, in one embodiment, a favelet might be created via a source website at some point prior to generating content to insert into a destination website. Alternatively, in another embodiment, a favelet might be created via another website or application upon generating content to insert into a destination website.

Turning now to FIG. 5, an exemplary clipboard is depicted. Assume that a destination website 500 is displayed in a browser window and that a favelet is selected (e.g., via a favorites menu) that is operable to render a clipboard 503 in the destination website 500. As such, upon selection of a favelet, the favelet can initiate execution of a JAVASCRIPT on the destination website 500 that results in presentation of a clipboard 503 (e.g., a window). The favelet could be operable to load the saved content 505 into the clipboard 503. That is, the favelet initiates a retrieval or reception of saved content 505 and presents the content within the clipboard 503. In some cases, a script obtains a URL for the content from a server in association with the source website from which the content is provided. In such a case, the URL causes the content to be displayed within the clipboard 503.

By way of example only, the favelet might create an IFRAME object in the clipboard 503 and set a number of properties (e.g., a width property, a height property, and a source (SRC) property) of the IFRAME object to display the saved content 505. In embodiments, the clipboard 503 includes a toolbar 504 containing various menu items that enable manipulation of the saved content 505 to be manipulated. The clipboard 503 can have a number of event handlers operable to handle various user input events. By way of example, event handlers could be added to the clipboard 503 to allow a user to drag and drop the saved content 505 from the clipboard 503 onto the destination website 500.

Turning now to FIG. 6, a diagram 600 depicting an exemplary destination website having content from a source website integrated therewith. Content 606 previously displayed within a clipboard 603 can be transferred to a location within the destination website 602. Accordingly, the content 606 might be dragged from the clipboard to a location within the destination website 602 and dropped such that the content 606 is integrated with the destination website 602. Once the saved content 606 has been dragged and dropped onto the destination website 602, the clipboard 603 could be closed or used to display other tools. By way of example, a color utility 604 might be displayed, which could be operable to change the color of various components of the content 606. A save button 605 can also be displayed. Such a button can be used to save any changes to the content 606. Saved changes might be saved on the domain associated with the source website where the saved content is currently stored.

Turning now to FIG. 7, a flow diagram depicting a method 700 of inserting content from a source website into a destination website is provided. Content from a source website is selected as selected content, as shown at block 701. According to an embodiment, content might be selected from a source website by using a preview window interface. The preview window could be used to load the content desired to be selected as selected content. A save or copy button in the preview window may be used to save the content as selected content. Saving the content could be performed a number of ways. For example, the content in the preview window could be loaded into a location on the source website for access by a favelet. As another example, a reference(s) to the current location of the selected content might be created by a save button and, thereafter, referenced by a favelet. As can be appreciated, content may be selected as selected content using alternative methods, such as, for example, through the use of input, selection, and/or mouse gestures. For example, a box could be drawn around content to be selected on the source website and a key combination could be used to indicate a saving function.

A destination website is navigated to, as shown at block 702. According to an embodiment of the invention, an address of a destination website could be entered in the address bar of a web browser. A key could be entered indicating the browser should display the website located at the entered address. According to another embodiment, a favorite indicating a website to be navigated to could be selected. Upon navigating to the destination website, a script is executed in the window displaying the destination website, as shown at block 703. According to an embodiment, the script is a favelet, operable to access previously selected content and display it in the destination website. In embodiments, a script is initiated via a user selection of a favelet presented within a favorites drop down menu.

Turning now to FIG. 8, a flow diagram depicting a method 800 of displaying previously selected content in a destination website is provided. Previously selected content is retrieved, as shown at block 801. Such content might be retrieved from a server associated with a source website providing or generating the content. According to one embodiment, a location of the selected content is retrieved. According to a further embodiment, a height and/or a width of the content is also retrieved. Retrieving selected content can be accomplished in other ways, for example, the data objects defining the content might be retrieved and loaded into the destination webpage.

A clipboard or window is added to or presented within the destination webpage, as shown at block 802. According to one embodiment, the clipboard contains one or more tools for interacting with the content. The tools may include, for example, tools to alter the appearance of the selected content and tools to save changes to the selected content.

The selected content is inserted onto the clipboard, as shown at block 803. By way of example, the selected content could be displayed in an IFRAME. Other ways may be used to inserted selected content within a clipboard. One or more event handlers are attached to the clipboard, as shown at block 804. In embodiments, an event handler allows a user input for manipulating the selected content inserted into the clipboard. For example, an event handler might allow the selected content within the clipboard to be dragged and dropped with a mouse onto the destination website.

Turning now to FIG. 9, a flow diagram depicting a method 900 of saving content as selected content is provided. Content, such as a webpage or an advertisement, is created using a source website in association with a first domain, as shown at block 901. Content might be created using a source website via a website design tool. A website design tool could be operable to create various content components, including webpages, and save the content to a particular domain. According to another embodiment, content is created by selecting components from a previously created webpage. For example, a mouse could be used to indicate a portion of a previously created webpage to use as a newly created webpage.

The content is saved as selected content, as shown at block 902. According to an embodiment, the content location and other parameters can be saved for access by a favelet. According to another embodiment, the content can be saved to a predetermined location that is accessible by a favelet. A height associated with the content is saved, as shown at block 903, and a width associated with the content is saved, as shown at block 904. The height and width can be saved to a location that is accessible to a favelet. Alternatively, the height and width could be saved within a favelet.

Turning now to FIG. 10, a flow diagram depicting a method 1000 of displaying selected content from a source website in a destination website is provided. Content is selected from a source website corresponding with a first domain, as shown at block 1001. In one embodiment, content is selected from a previously created webpage. In another embodiment, content is created as new content via the source website and, thereafter, selected as selected content. There are a number of ways to selected content as selected content. By way of example, the method 900 in FIG. 9 might be a suitable way to select content as selected content.

A destination website in association with a second domain is navigated to, as shown at block 1002. Such navigation to a destination website may occur by entering an address to the destination website located in the second domain via an address bar of a web browser, selecting a favorite representing a URL of the destination website, or the like. In a window displaying the destination website from the second domain, a script is executed, as shown at block 1003. The script may be operable to insert the selected content into the destination website corresponding with the second domain. There are a number of ways a script can insert the selected content. By way of example, the method 800 of FIG. 8 could be used to insert the selected content into the destination website.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method comprising:
   creating a favelet and adding the favelet as a favorite within a web browser;
   creating a source webpage residing in the first domain associated with at least one first server remote from a user device;
   selecting content within the source webpage,
   saving a height property, width property, and source property of the selected content, navigating to the destination website, wherein the destination website is in a second domain associated with at least one second server remote from the user device;
   upon navigating to the destination website, selecting the favelet; and
   in response to the selection of the favelet and in the web browser window displaying the destination website via the user device, executing the favelet that performs a process that includes:
   retrieving the selected content from the source webpage in the first domain associated with the at least one first server remote from the user device,
   adding a clipboard to the destination website in the second domain associated with the at least one second server remote from the user device,
   creating an IFrame object in accordance with the source property, height property, and width property of the selected content, and inserting the IFrame object into the destination website,
   inserting the selected content onto the clipboard, and
   attaching one or more event handlers to the clipboard configured to allow the selected content to be dragged and dropped into the destination website within the browser window, wherein the event handlers allow the selected content to be modified in both the first domain and the second domain.

2. The method of claim 1, wherein selecting content from the source website comprises selecting a save option from a preview window of a website design tool.

3. The method of claim 1, wherein the favelet is saved as a bookmark via the source website.

4. One or more non-transitory computer readable storage media storing computer-executable instructions for performing a method of previewing content inserted from a source website in a first domain into a destination website in a second domain, the method comprising:
   creating a favelet and adding the favelet as a favorite within a web browser;
   creating a source webpage residing in the first domain associated with at least one first server remote from a user device;
   selecting content within the source webpage,
   saving a height property, width property, and source property of the selected content, navigating to the destination website, wherein the destination website is in a second domain associated with at least one second server remote from the user device;
   upon navigating to the destination website, selecting the favelet; and
   in response to the selection of the favelet and in the web browser window displaying the destination website via the user device, executing the favelet that performs a process that includes:
   retrieving the selected content from the source webpage in the first domain associated with the at least one first server remote from the user device,
   adding a clipboard to the destination website in the second domain associated with the at least one second server remote from the user device,
   creating an IFrame object in accordance with the source property, height property, and width property of the selected content, and inserting the IFrame object into the destination website,
   inserting the selected content onto the clipboard, and
   attaching one or more event handlers to the clipboard configured to allow the selected content to be dragged and dropped into the destination website within the browser window, wherein the event handlers allow the selected content to be modified in both the first domain and the second domain.

5. The media of claim 4, wherein selecting content from the first domain as selected content comprises:
   selecting a save button, wherein selection of the save button saves the source webpage as selected content,
   saves the height property associated with the source webpage, and
   saves the width property associated with the source webpage.

6. The media of claim 4, wherein the favelet is saved as a bookmark from the first domain.

7. The media of claim 4, wherein the clipboard comprises a color picker, said color picker configured to adjust one or more colors of one or more components of the selected content.

8. One or more non-transitory computer readable storage media storing computer-executable instructions for performing a method of inserting content from a first domain into a destination website, the method comprising:
   creating a favelet and adding the favelet as a favorite within a web browser;
   creating a source webpage residing in the first domain associated with at least one first server remote from a user device;
   selecting content within the source webpage and saving a height property, width property, and source property of the selected content;
   navigating to the destination website, wherein the destination website is in a second domain associated with at least one second server remote from the user device;
   upon navigating to the destination website, selecting the favelet; and in response to the selection of the favelet and in the web browser window displaying the destination website via the user device, executing the favelet that performs a process that includes:

retrieving the selected content from the first domain associated with the at least one first server remote from the user device, adding a clipboard to the destination website from the second domain associated with the at least one second server remote from the user device, creating an IFrame object in accordance with the source property, height property, and width property of the selected content, and inserting the IFrame object into the destination website, inserting the selected content onto the clipboard, and attaching one or more event handlers to the clipboard configured to allow the selected content to be dragged and dropped into the destination website within the browser window, wherein the event handlers allow the selected content to be modified in both the first domain and the second domain.

9. The media of claim 8, wherein the favelet is saved as a bookmark from the first domain.

10. The media of claim 8, wherein the clipboard comprises a color picker, said color picker configured to adjust one or more colors of one or more components of the selected content.

* * * * *